United States Patent [19]

Higgs et al.

[11] 4,417,467
[45] Nov. 29, 1983

[54] GRAPHICAL DISPLAY OF ENGINE CYLINDER PARAMETERS

[75] Inventors: Raymond J. Higgs; Leslie W. Palmer, both of West Suffield, Conn.

[73] Assignee: United Technologies Corporation, Hartford, Conn.

[21] Appl. No.: 363,362

[22] Filed: Mar. 29, 1982

[51] Int. Cl.[3] ............................................. G01M 15/00
[52] U.S. Cl. ..................................... 73/117.3; 324/378
[58] Field of Search ..................... 73/116, 117.3, 115; 116/281; 364/551; 324/378, 386

[56] References Cited

U.S. PATENT DOCUMENTS 3,300,785  1/1967  Richardson et al. ....... 73/117.3 UX
3,952,586  4/1976  Hanson et al. .................... 73/116 X Primary Examiner—Jerry W. Myracle
Attorney, Agent, or Firm—Dominic J. Chiantera

[57] ABSTRACT

Cylinder engine data, is displayed in a bar chart graphics mode format on a cathode ray tube (CRT); the data from each cylinder is displayed in dual bar segments comprising a first bar representing the mean value and a second bar representing the mean deviation of the measured parameter data, the first bar extending from a zero baseline on the abscissa to the mean measured value as represented graphically by comparison to a scaled ordinate, the second bar being generally centered about the first bar mean value and extending at its end points to the actual peak and actual minimum values of the selected parameter.

8 Claims, 3 Drawing Figures

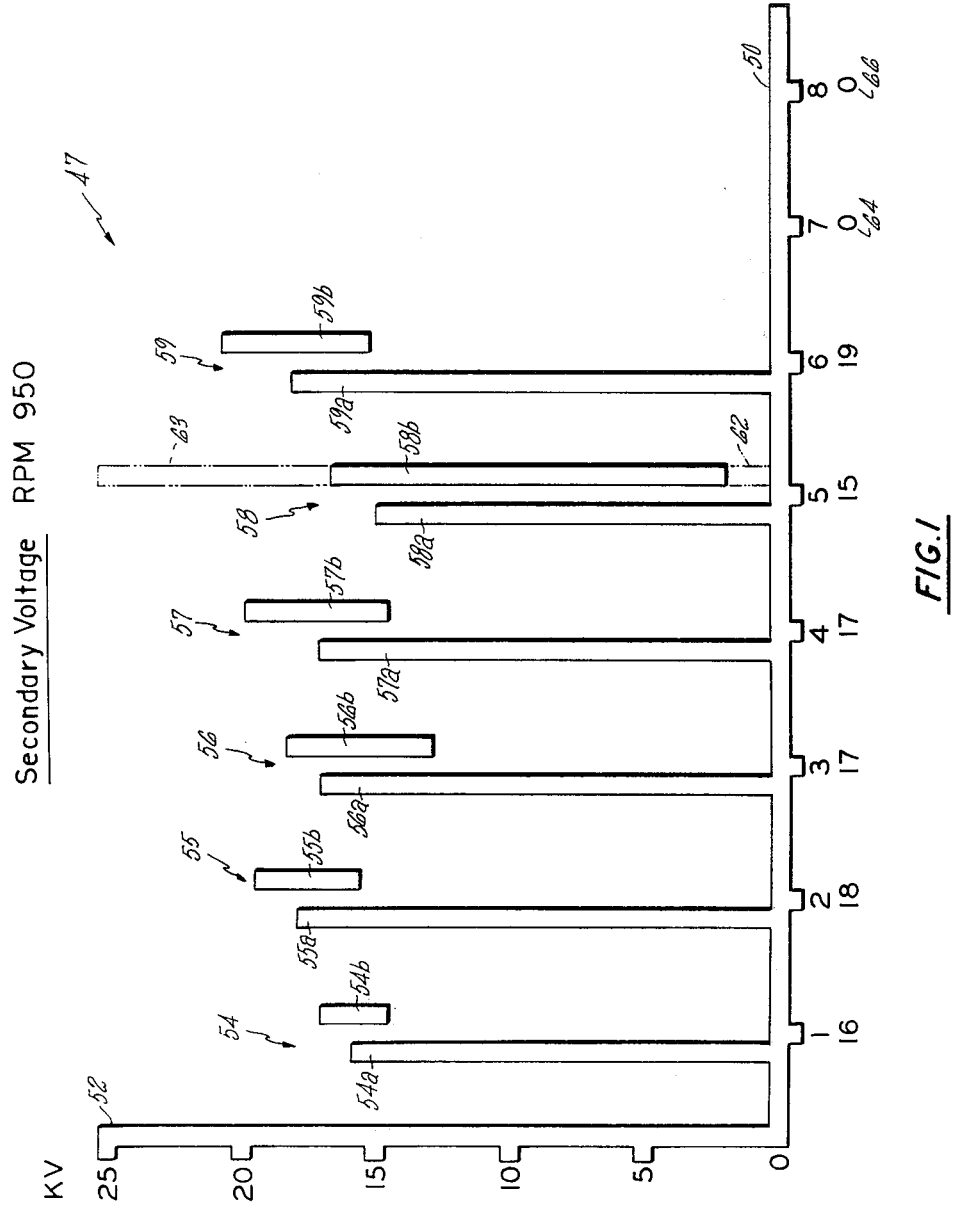

GRAPHICAL DISPLAY OF ENGINE CYLINDER PARAMETERS

DESCRIPTION

TECHNICAL FIELD

This invention relates to visual data display formats, and more particularly to a graphics mode CRT data display format of per cylinder performance data for an internal combustion engine.

BACKGROUND ART

The increased use of microprocessor based diagnostic test equipment in the automotive repair field has provided increased operator productivity in both engine performance testing and repair. The newer test equipment not only allows for more precise measurement of the various engine performance criteria, but it performs these measurements more quickly. In those applications in which the measured data is used for performance acceptance, or in compiling a performance history, data display is not necessarily of concern. However, the quality and format of the data display are important in those applications where the data must be immediately evaluated by the human operator, e.g. those interactive applications in which the test equipment is used to provide the resulting instantaneous performance indication of a repair or adjustment made by the operator on the engine. In other words, those applications in which the equipment is "in the loop" together with the operator performing the adjustment.

Although the equipment data acquisition speed is important, in this interactive mode the limiting factor is the reaction time, or "interpretation speed" required by the operator. That is, the speed with which the operator may read and understand the meaning of the sensed data and reach a conclusion. The prior art use of oscilloscope displays and separate meter indications (analog and digital) require the operator to make interpretative decisions, e.g. the location of the measurement indicator on the scale, or the "relative value" of the single measurement readout absent corresponding readouts of the other performance measurements criteria (relative power contribution), or the need to remember oscilloscope patterns.

DISCLOSURE OF INVENTION

The object of the present invention is to provide a displayed data format which minimizes the interpretative time and maximizes the response time of the operator.

According to the present invention, sensed per cylinder engine data, selected by the operator, is displayed in a bar chart graphics mode format on a cathode ray tube (CRT); the data from each cylinder is displayed in dual bar segments comprising a first bar representing the mean value and a second bar representing the mean deviation of the measured parameter data, the first bar extending from a zero baseline on the abscissa to the mean measured value as represented graphically by comparison to a scaled ordinate, the second bar being generally centered about the first bar mean value and extending at its end points to the actual peak and actual minimum values of the selected parameter; the dual bar segments providing four indices of per cylinder parameter information, including the mean value, the min and max values, and the mean deviation. In further accord with the present invention, the graphic format provides dual bar segment display of the measured per cylinder information from all cylinders simultaneously, each appearing successively along the display abscissa in display identified order to allow comparison of relative performance. In still further accord with the present invention, the mean measured value of each cylinder parameter is additionally displayed numerically beneath the cylinder's designated abscissa location on the display.

The graphic display format of the present invention allows for a "plain english" data display which minimizes the interpretive time required by the operator, i.e. enhances the human engineering factors. It increases the operator response time by eliminating the need to memorize prior readings (for relative comparison) or to interpret values.

The invention has utility in displaying a number of alternative per cylinder performance parameters, such as cylinder power contribution, cylinder dwell, and secondary ignition (spark plug firing voltages). Since the mean deviation bar segment displays the actual min/max (peak and valley) values measured over the total number of engine cycles, it highlights intermittent operations. This is especially important in measurement of spark plug firing voltages to diagnose ignition faults, which includes detection of intermittent open circuits. The presence of spark plug intermittent operation is often overlooked due to the inability of the prior art displays to capture the intermittent faults. The present invention format immediately displays intermittent operation, with the second segment deviation bar displaying an absolute max value in resonse to an open, and a zero base minimum in response to a shorted condition.

These and other objects, features, and advantages of the present invention will become more apparent in light of the following detailed description of a best mode embodiment thereof, as illustrated in the accompanying Drawing.

BRIEF DESCRIPTION OF DRAWING(S)

FIG. 1 is an illustration of the graphics display format of the present invention for an exemplary, per cylinder spark KV parameter;

FIG. 2 is a partial illustration of a characteristic of the FIG. 1 display; and

BEST MODE FOR CARRYING OUT THE INVENTION

Figure 3:
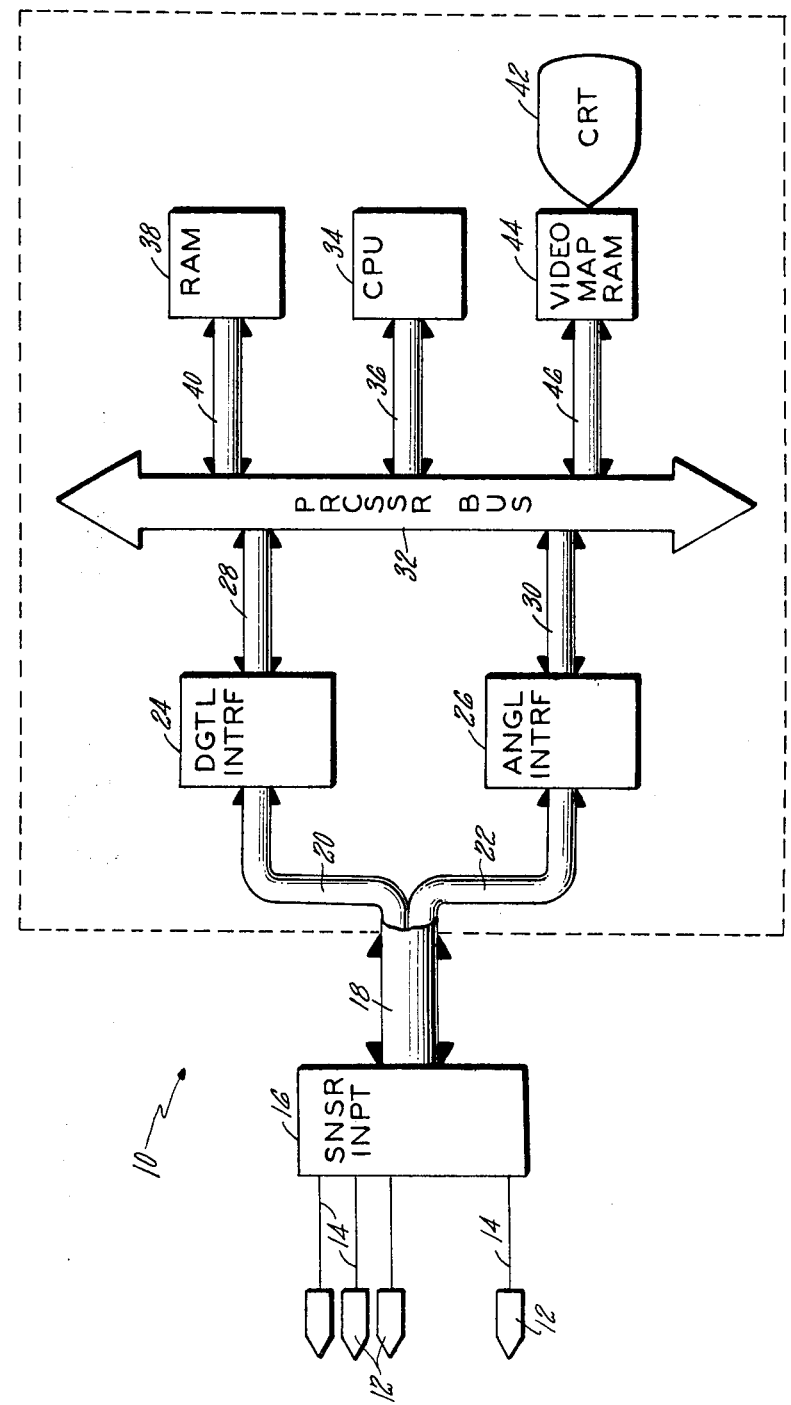
FIG. 3 is a simplified schematic illustration of the architecture of a typical data acquisition system in which the present invention may be used.

Referring first to FIG. 3, a typical data acquisition unit (DAU) 10 in which the present invention may be used, includes one or more engine sensor probes 12 connected through sensor lines 14 to a DAU sensor interface unit 16. The probes include a spark plug high voltage KV probe, an engine timing light, manifold vacuum sensor, etc., and the interface unit itself may comprise a portable probe carrier of the type disclosed and claimed in a commonly owned, copending patent application of common assignee herewith entitled PORTABLE PROBE CARRIER, U.S. Ser. No. 363,358 filed on even data herewith by L. W. Palmer. The sensor interface unit is connected through a conduit 18 to the DAU console 20.

The conduit 18 includes separate digital and analog signal lines 20, 22 connected, respectively, to digital and analog interfaces 24, 26 in the DAU. Each interface is of a type known in the art, such as digital interface DR11-C and analog interface ADAC 600-11, which provide user interface through I/O lines 28, 30 to a microprocessor bus 32. The digital interface receives and transmits discretes between the DAU and the various sensor probes for timing and interrupt mode operation. The analog interface 26 receives and converts the sensed analog data (through interface A/D hardware) into its digital signal equivalent.

The DAU includes a microprocessor CPU 34 connected through I/O lines 36 to the bus. The microprocessor is of a type known in the art, such as the Digital Equipment Corporation (DEC) LSI-11 or equivalent; the exact type of microprocessor being dependent on the particular DAU application, e.g. number of tests to be performed, etc. In more complex systems involving higher throughput a mini computer, such as the DEC Model PDP-11/34 may be used, with a software data system based on the DEC RSX 11-M multitask real time software package. In either case the particular type CPU used is that selected by those skilled in the art based on system requirements, and as such forms no part of the present invention. Whether considered necessary, or practical, any one of a number of known processing systems and software packages may be used, as may be obvious or readily apparent to those skilled in the art.

The DAU further includes a random access memory (RAM) 38 of a type known in the art, with memory storage capacity based on total data storage requirements. The RAM, typically a MOS type with read/write capability, is connected through I/O lines 40 to the CPU bus. Finally, the DAU includes a CRT video display 42. The CRT, used in the graphics mode, is driven by a video map RAM 44 through I/O lines 46 from the processor bus 32.

In the operation of the DAU the sensed engine data on lines 22 is converted in the analog interface 26 to the digital signal equivalent and stored in the RAM 38. The CPU 34 provides the control interrupts and discretes through the digital interface 24 to control the probes, e.g. timing light, etc., and provides the timing and enables disable signals to the analog interface to control the sample times and A/D conversion. The data is measured for each cylinder, typically over some number of engine cycles with the data from each common cycle being grouped together. The CPU 34 registers the sets of common cycle data at selected addresses in RAM during the data acquisition routine, for later statistical processing.

The actual data acquisition routine used may also include any one of a number of known routines, such as that described for spark firing data acquisition in U.S. Pat. No. 4,291,383 to Tedeschi et al, also of common assignee herewith. In Tedeschi et al an interrupt format is used in which the Hi and Lo coil voltage signals are used as interrupt indications for measuring peak KV and spark duration of each cylinder. The association of measured KV and spark duration with identified cylinders is provided by keying the data measurements to the number one spark plug firing. This, together with a knowledge of the engines firing order, identifies each remaining spark plug.

Once the data acquisition is complete the CPU provides statistical processing of the several engine cycles of data obtained for each cylinder. As stated hereinbefore the selected per cylinder performance indicator may be any one of a number of individual cylinder events of interest, such as spark plug (KV) firing, per cylinder power balance based on sub-cyclic manifold vacuum fluctuation, or cylinder dwell angle. The processing provides each cylinder's mean sample value and the mean deviation, which reports the actual maximum and actual minimum values obtained over the sample cycle period. This allows for comparison of individual cylinder performance on a relative basis with other cylinders in addition to providing information on absolute performance.

One of the problems with all data acquisition systems, such as Tedeschi et al, is in the data display. In the illustrated Tedeschi et al situation where the engine is tested for performance acceptance, and performance history is of interest, a table format of the statistical data is provided. This is unsatisfactory for a garage repair application where the need is to provide instant feedback information to the operator, to allow for instant adjustment or immediate action or repair in response to the data values. In such applications a dynamic video display is required as opposed to a permanent, static printout. In the present invention this is provided through the use of the graphics mode display format on the CRT 42.

Referring now to FIG. 1, in the CRT graphics mode the CRT screen area 46 is quantized into an X-Y matrix; e.g. 32-16 number of grid locations; each location 48 (FIG. 2) itself comprising some smaller matrix, e.g. 2-3. (49, FIG. 2). In the present display format the CRT graphics mode is used to provide a bar chart display in an X, Y rectangular coordinate system covering eight cylinders. In FIG. 1 the selected per cylinder parameter is secondary ignition voltage, i.e. individual cylinder spark plug KV mesurements for a six cylinder engine at engine speed of 950 RPM. As shown, each cylinder is individually identified by cylinder number (1–8) along the abscissa 50 and the actual values obtained for each cylinder are displayed against a scaled ordinate 52 of the selected parameter, e.g. KV for the secondary voltage display shown.

Each cylinder's displayed data 54–59 is shown to include dual bar segments, i.e. a pair of bar segments 54a, b–59a, b. The first bar segments (54a–59a) in each dual set represent the mean measure value of the cylinder parameter, e.g. KV, which is also printed in numeric characters beneath each cylinder number. As such, the printed data assures quantitative information while the bar segment provides both quantitative absolute and qualitative relative indications of each cylinders performance.

Each first bar segment extends from the zero base abscissa to the respective mean value. The second bar segments (54b–59b) are each more or less centered on the associated mean values and extend at the extremities to the actual maximum and minimum (peak and valley) measurements obtained over the selected number of measured engine cycles. As such, the second bar segments represent the mean deviation, which itself provides a quantitative performance indicator. A widely swinging mean deviation, such as 58b for No. 5 cylinder, would appear to indicate intermittent operation requiring further retest or visual check. More or less uniform deviations, as with uniform mean values, would indicate comparitive performance, i.e. relative balance, among all the cylinders. An actual "short" (zero minimum value) would cause a mean deviation bar segment to extend to the zero base as shown by phantom lines 62 for bar segment 586 and an "open" would result in an absolute display maximum value as shown by phantom line 63. As such, the mean deviation bar captures (remembers) the intermittent.

As shown in FIG. 1, the format also includes additional alpha-numeric information related to the identity of the test data, the scaled ordinate units, and the engine test speed. To distinguish between an engine with less than eight cylinders and a failure of the display, the format includes printout of a "0" numeric quantity (64, 66) for all unused cylinders (cylinders 7, 8 in the exemplary illustration). Similarly the display of actual engine speed at time of data acquisition allows the operator to evaluate performance at many different operating conditions.

Although the invention has been shown and described with respect to a best mode embodiment thereof, it should be understood by those skilled in the art that the foregoing and various other changes, omissions and additions in the form and detail thereof may be made therein without departing from the spirit and scope of this invention.

We claim:

1. Apparatus for measurement of cylinder performance in an internal combustion (IC) engine, comprising:
    sensor means for providing sensed signals of the actual values of selected parameters indicative of cylinder performance over a selected set of engine cycles;
    signal processing means, responsive to said sensed signals for each cylinder and including memory means for storing signals, said processing means calculating and storing in said memory means a mean value signal and a mean deviation value signal for each set of sensed parameter signal data acquired from each cylinder;
    as characterized by:
    display means, responsive to said signal processing means for displaying visually, in rectangular coordinates, each cylinder's associated mean value and mean deviation value signal as dual parallel bar segments including a first bar representing said mean value and a second bar adjacent thereto and representing said mean deviation value, said first bar extending perpendicularly from said rectangular coordinate abscissa to a length representative of said mean value as indicated on a scaled ordinate, said second bar being generally centered about said first bar mean value and extending at either end to the actual peak value and actual minimum value obtained for the set of measured parameter data, whereby said dual bar segments provide four visual indices of cylinder performance including the parameter mean value, the minimum and maximum parameter values, and the parameter mean deviation value.

2. The apparatus of claim 1, wherein said display means provides said dual parallel bar display of mean value and mean deviation value for all engine cylinders, simultaneously, each cylinder's dual bar segment appearing in identified order along the display abscissa to allow comparison of relative performance.

3. The apparatus of claim 2, wherein said display means further provides simultaneous numeric character display of the actual mean value for each cylinder adjacent to the abscissa location of the associated cylinder.

4. The apparatus of claim 3, wherein said display means, in addition to providing simultaneous numeric character display of the actual mean value associated with each displayed cylinder dual bar segment, further provides a zero numeric character display for any cylinder location not used in a displayed set of measurements, thereby indicating that the nonuse is the result of the limited number of actual cylinders for the engine under test rather than apparatus failure.

5. The apparatus of claim 3, wherein
    said sensor means further includes speed sensing means for providing actual engine speed signals over the set of engine cycles associated with measurement of said cylinders selected parameter;
    said processing means is responsive to said actual engine speed signals for providing an average speed value signal thereof; and wherein
    said display means further provides simultaneous alpha-numeric display of said average engine speed value for the set of engine cycles associated with the displayed cylinder data.

6. The apparatus of claim 2 wherein said cylinder selected parameter is spark plug firing voltage.

7. The apparatus of claim 2 wherein said cylinder selected parameter is per cylinder dwell.

8. The apparatus of claim 2, wherein said cylinder selected parameter is engine sub-cyclic intake manifold vacuum values as contributed by each cylinder, said dual parallel bar segments display, in combination, indicating the relative power balance of the engine cylinders.

* * * * *

UNITED STATES PATENT AND TRADEMARK OFFICE
CERTIFICATE OF CORRECTION

PATENT NO. : 4,417,467

DATED : November 29, 1983

INVENTOR(S) : Higgs et al.

It is certified that error appears in the above-identified patent and that said Letters Patent is hereby corrected as shown below:

Column 2, line 32: "resonse" should read --response--

Column 2, line 63: "data" should read --date--

Column 2, line 68: "20,22" should read --21,22--

Column 4, line 27: "46" should read --47--

Column 4, line 65: "comparitive" should read --comparative--

Signed and Sealed this

Twelfth Day of June 1984

[SEAL]

Attest:

GERALD J. MOSSINGHOFF

Attesting Officer

Commissioner of Patents and Trademarks